Patented Jan. 27, 1942

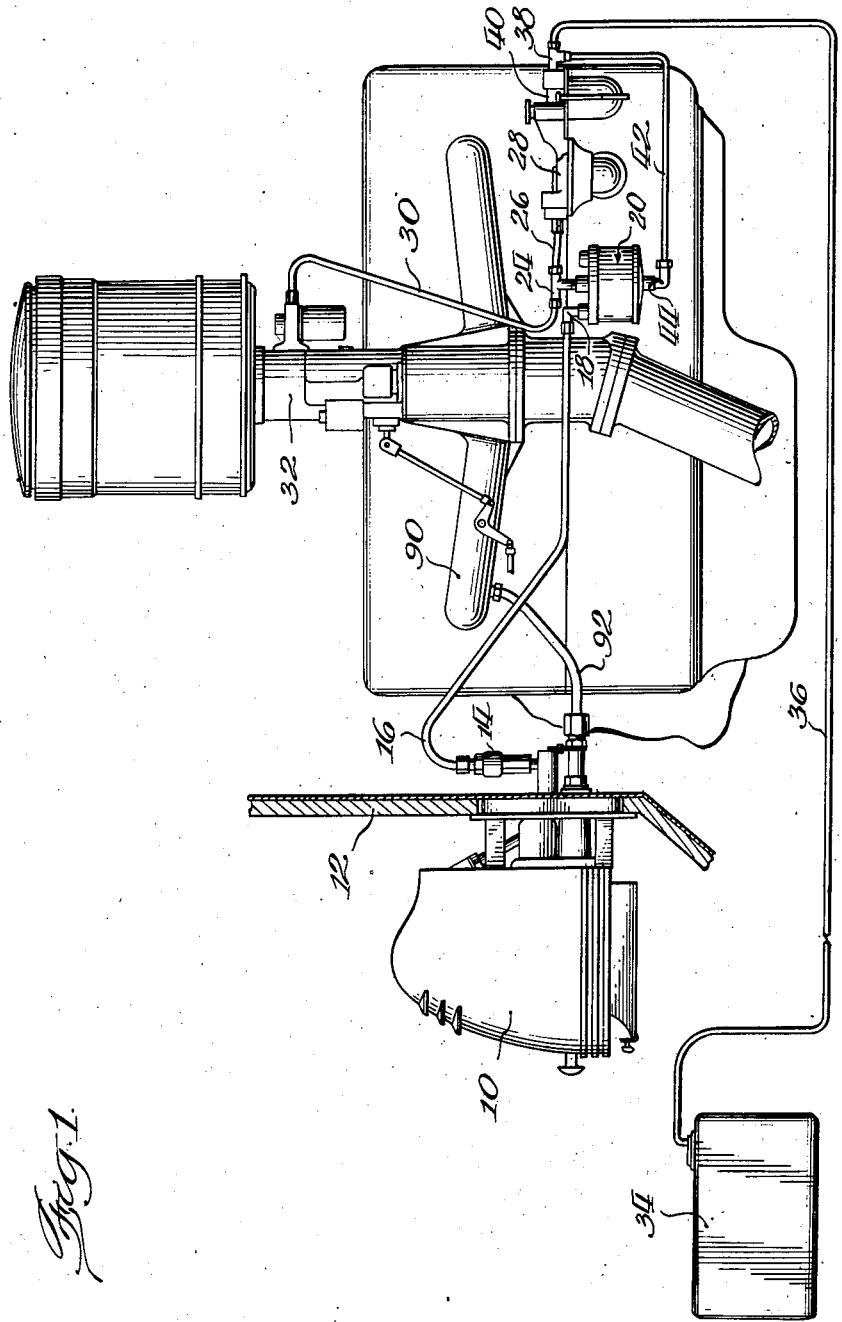

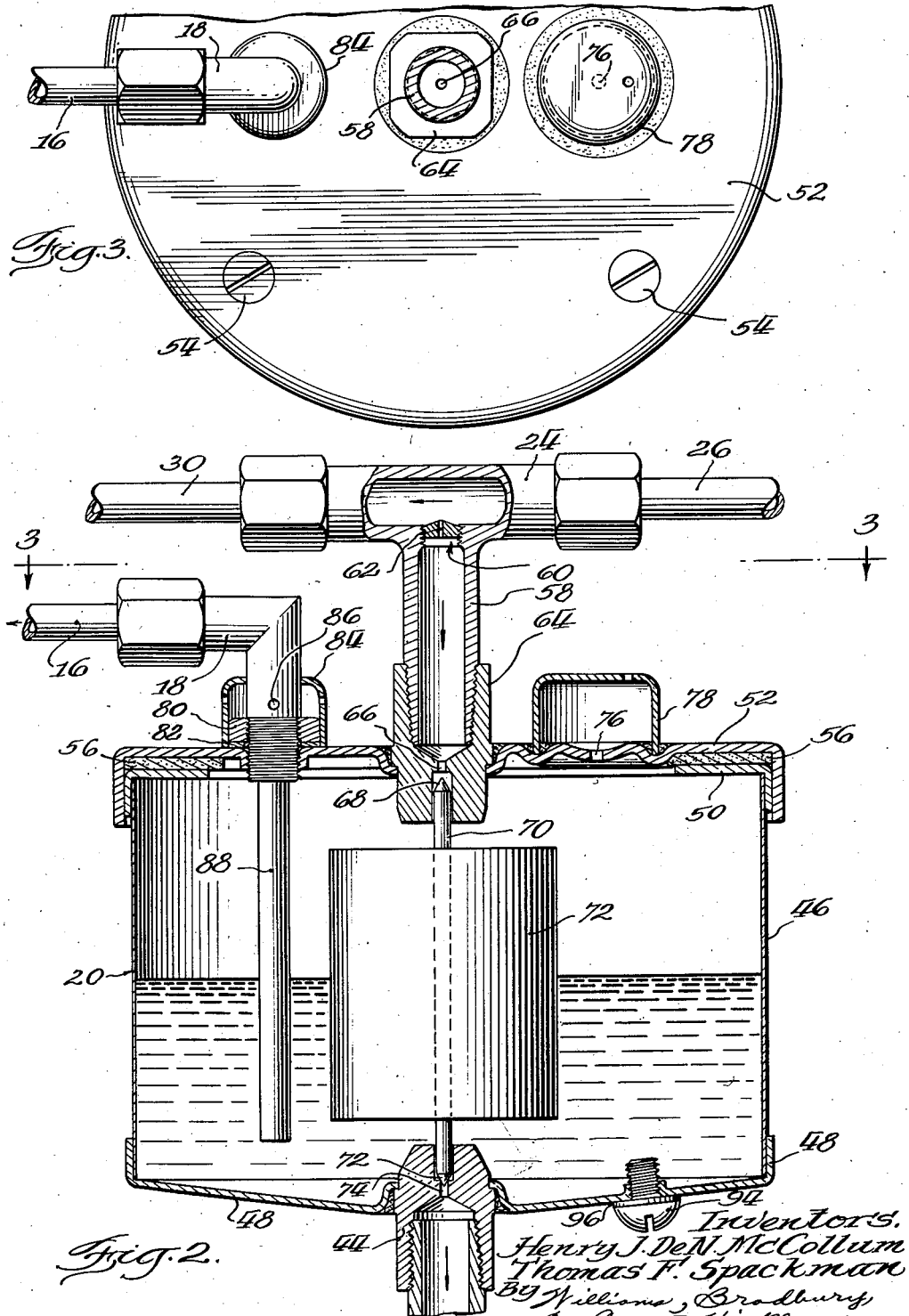

2,270,956

UNITED STATES PATENT OFFICE 2,270,956

AUTOMOBILE HEATER

Henry J. De N. McCollum and Thomas F. Spackman, Chicago, Ill.; said Spackman assignor to Stewart-Warner Corporation, Chicago, Ill., a corporation of Virginia Application January 2, 1940, Serial No. 312,064

6 Claims. (Cl. 237—12.3)

Our invention relates generally to automobile heating systems, and more particularly to improvements in the fuel supply system for automobile heaters of the internal combustion type, and for the supply of liquid fuel to other fuel consuming devices which are intermittently operated.

Some difficulty has been experienced in the operation of fuel supply systems for automobile heaters of the internal combustion type because of the fact that the heaters are ordinarily not used throughout the summer, and therefore there is a tendency for the controlling valves to adhere to their seats due to the gumming effect of stagnant gasoline. Thus, any auxiliary float bowl provided for maintaining an auxiliary supply of gasoline for the heater is likely, during the summer months, to become inoperative due to the formation of deposits of gum which form on the moving parts when the gasoline in the auxiliary reservoir is permitted to stagnate for an extended period of time.

It is therefore an object of our invention to provide an improved float controlled auxiliary reservoir for maintaining a supply of gasoline available for consumption by an automobile heater or similar fuel consuming device.

A further object is to provide an improved float controlled auxiliary reservoir in which the fuel is caused to flow through the reservoir irrespective of whether or not any fuel is being withdrawn from the reservoir by the fuel consuming device.

A further object is to provide an improved float controlled auxiliary reservoir for automobile heaters of the internal combustion type which is simple in construction, will operate effectively over long periods of time, which may be economically manufactured, and which may be easily installed.

Other objects will appear from the following description, reference being had to the accompanying drawings, in which:

Figure 1 is a somewhat diagrammatic side elevational view of the fuel feeding system of an automobile equipped with a heater of the internal combustion type;

Figure 2 is a central vertical sectional view of the auxiliary float controlled reservoir provided for maintaining a supply of gasoline for the heater; and, Figure 3 is a fragmentary horizontal sectional view of the auxiliary float controlled reservoir taken on the line 3—3 of Fig. 2.

Referring to Fig. 1, a heater 10 is illustrated as being mounted upon the dash 12 of an automobile, the heater being of the internal combustion type, such as disclosed, for example, in the co-pending application of Henry J. De N. McCollum, Serial No. 120,523, filed January 14, 1937.

The heater includes a carbureting device 14, to which fuel is supplied through a conduit 16, the conduit 16 being connected to an elbow fitting 18 forming part of the auxiliary float controlled reservoir 20. The reservoir 20 has a T inlet fitting 24 secured to the top thereof, one branch of the fitting being connected by a conduit 26 to a fuel pump 28, while the other branch of the T 24 is connected by a conduit 30 with the engine carbureting device 32. The fuel pump 28 draws gasoline from a main tank 34 through a conduit 36 which is connected by a T fitting 38 with a strainer 40, the strainer 40 being connected directly to the fuel pump 28. The depending branch of the T 38 is connected by a conduit 42 with an outlet fitting 44 secured in the bottom of the auxiliary fuel reservoir 20.

Referring now to Figs. 2 and 3, the auxiliary fuel reservoir 20 comprises a cylindrical shell 46 which has a bottom 48 and a flanged ring 50 welded or otherwise suitably secured thereto. A flanged top 52 is secured to the ring 50 by a plurality of screws 54, a gasket 56 being interposed between the top 52 and the ring 50 to seal the joint.

The depending branch 58 of the T 24 is internally threaded to receive a flow restricting plug 60 which has a relatively minute passageway 62 extending therethrough. The branch 58 is threaded in an inlet valve fitting 64 which extends through the top 52 of the reservoir and is suitably secured to the top as by welding or soldering, and has an inlet port 66 which is adapted to be closed by an inlet valve 68 formed in the upper end of a stem 70. A float 72 is secured to the stem 70 so as to raise and lower the stem in accordance with the raising and lowering of the level of gasoline contained in the reservoir. The lower end of the stem 70 has an outlet valve 72 formed thereon for cooperation with an outlet port 74 formed in the outlet fitting 44. The fittings 44 and 64 are suitably formed adjacent the ports 74 and 66 to provide guides for the valve stem 70. There is sufficient clearance between the stem and the guiding surfaces to permit free flow of gasoline between the stem and its guides. The top cover 52 has a vent port 76 formed therein which is protected by an apertured inverted cup 78, the lower edge of which fits in a suitable depression formed in the top 52, and is secured thereto by solder. The elbow 18 is threaded in the top 52, being locked therein by a nut 80 and lock washer 82, the nut 80 being covered by an apertured protector 84 which prevents foreign matter from entering an air admission opening 86 formed in the elbow 18. The elbow 18 has a tube 88 secured thereto and depending into the reservoir to a point adjacent the bottom thereof, having an opening for admitting gasoline at its lower end. The details of the construction of the elbow 18, tube 88, and associated parts are more fully disclosed in the co-pending application of Henry J. De N. Mc-Collum, Serial No. 177,075, filed November 29, 1937. It is sufficient for the purposes of description of the present invention to understand that gasoline flows to the carbureting device 14 of the heater through the tube 88, elbow 18, and conduit 16, having admixed therewith a certain proportion of air which is admitted through the aperture 86 of the elbow 18. It will be understood that the sub-atmospheric pressure in the heater is obtained by virtue of its connection with the intake manifold 90 of the engine by means of a conduit 92.

The bottom 48 of the reservoir is provided with a drain opening normally closed by a screw 94, a seal being effected by suitable gasket 96.

Whenever the automobile engine is being operated, the fuel pump 28 will force gasoline through the conduit 26, the horizontal passageway through the T 24 and conduit 30 to the engine carburetor 32. Thus, under normal conditions of operation, gasoline will flow continuously past the port 62 in the plug 60, and thence through the inlet port 66 to the auxiliary reservoir, providing the level of gasoline therein is below the predetermined operating level desired. Under these circumstances, the float 72 will be in the position in which it is shown in Fig. 2, and air displaced by the entering gasoline may escape to the atmosphere through the vent port 76. Under these circumstances, it will be noted that the outlet valve 72 rests upon its seat so that the level of the gasoline in the reservoir will gradually rise until the float is raised sufficiently to cause the valve 68 to close the inlet port 66. When the float rises, the outlet valve 72 is, of course, open so that gasoline begins to flow from the reservoir through the outlet ports 74, into the outlet fitting 44, and through conduit 42 to the T 38, under the influence of the suction produced by the fuel pump 28. Thus, the level of the gasoline in the auxiliary reservoir will be lowered until the float 72 again drops to open the inlet valve 68.

From the above description, it will be clear that the gasoline within the auxiliary reservoir will be maintained within close limits at a predetermined level, the extent of possible variations in the level being determined by the distance between the valve 68 and its seat at the inlet port 66 when the float is in the position in which it is shown in Fig. 3. Whenever the engine is in operation, the float will thus move up and down, and by this movement will maintain the level of the gasoline in the reservoir at the required level. Due to the fact that gasoline is continuously flowing through the auxiliary reservoir during the periods of operation of the automobile, the gasoline in the reservoir will at all times be relatively fresh and will not have the tendency to gum up the valves, as might readily occur if the gasoline were permitted to stagnate in the reservoir for long periods of time, as would be the case during the summer months when the heater would not be in operation. Thus, the difficulty occasionally encountered in the past of having the float controlled valve gum to its seat due to non-use of the heater is avoided.

The size of the restriction port 62 in the plug 60 is sufficiently small that the amount of gasoline flowing therethrough is not great enough to place an appreciable load upon the fuel pump, or to interfere with the supply of gasoline to the engine carburetor. By making the inlet port 66 sufficiently small, the plug 60, with its restricted port 62, could be omitted. However, it is desirable that the port 66 be made relatively large so as to facilitate the manufacture of the inlet valve fitting 64 and its valve 68. Furthermore, a supply of fresh gasoline is at all times available for consumption by the heater so that difficulties in heater operation due to supplying stagnant gasoline thereto are completely avoided.

If the inlet to the reservoir is sufficiently restricted, it is unnecessary to provide an inlet valve. Thus, if the port 62 is made sufficiently small relative to the size of the outlet port 74, the valve 68 and its port 66 may be omitted. Under these conditions, the upper end of the valve stem 70 will function merely as a guide for the float 72, and the upward movement of the latter may be limited by its engagement with the lower end of the fitting 64, or other suitable stop means may be provided. The relative sizes of the ports 62 and 74 should be such that under the differential pressures existing in the system the fuel may flow through the outlet at a rate several times as great as it can flow through the inlet. If this latter condition is satisfied, there will be no danger of flooding the reservoir even though the outlet should be partially obstructed temporarily.

Similarly, some of the advantages of the invention may be obtained by providing a restriction in the outlet of the reservoir and controlling the flow of the fuel into the reservoir by means of an inlet valve operated by the float. In such system, the fuel will flow through the reservoir continuously, but the possibility of flooding the reservoir due to accidental stoppage would be greater than in the devices previously described.

While we have shown and described a particular embodiment of our invention, it will be apparent to those skilled in the art that numerous modifications and variations may be made without departing from the underlying principles of our invention. We therefore desire, by the following claims, to include within the scope of our invention all such modifications and variations by which substantially the results of our invention may be obtained by the use of substantially the same or equivalent means.

We claim:

1. In a fuel supply system for an automobile heater of the internal combustion type which is mounted upon an automobile having an internal combustion engine, a carburetor, a fuel pump, and a conduit connecting said fuel pump with said carburetor; the combination of an auxiliary reservoir having an inlet port and an outlet port, means for withdrawing fuel from said reservoir to supply said heater, means connecting the inlet port of said reservoir to said conduit, a conduit connecting said outlet port of said reservoir with the inlet side of said fuel pump, a float in said reservoir, a valve in said inlet port and a valve in said outlet port, said valves being operated by said float in a manner to open the inlet port and close the outlet port when the fuel in said reservoir drops below a predetermined level and to close said inlet port and open said outlet port when the fuel in said reservoir rises above a predetermined level.

2. In a fuel supply system for a fuel consuming device subject to intermittent operation, an auxiliary fuel reservoir having an inlet port and an outlet port, an inlet valve and an outlet valve for controlling the flow of fuel through said ports respectively, a float operable to close said inlet valve and open said outlet valve when the fuel in said reservoir rises above a predetermined level and to open said inlet valve and close said outlet valve when the fuel in said reservoir drops below a predetermined level, a fuel pump having an inlet and an outlet, a conduit connecting the outlet of said pump to said inlet port, a conduit connecting said outlet port to the inlet of said fuel pump, and means for supplying fuel from said reservoir to said fuel consuming device.

3. In a fuel supply system for a fuel consuming device associated with an internal combustion engine, in which the engine is provided with a carburetor and a fuel pump for supplying fuel to said carburetor, the combination of an auxiliary reservoir having an inlet at the top thereof and an outlet at the bottom thereof, means for conducting fuel from said reservoir to the fuel consuming device, conduits respectively connecting the outlet of said fuel pump with the inlet of said reservoir and the outlet of said reservoir with the inlet of said fuel pump, and float controlled means within said reservoir for maintaining the fuel level therein between predetermined limits, said means operating to permit circulation of fuel through said reservoir whenever the fuel pump is in operation.

4. In a fuel supply system for a fuel consuming device subject to intermittent operation and used in conjunction with an internal combustion engine having a carburetor, a fuel pump, a fuel supply means supplying fuel to said pump, and a conduit connecting said fuel pump with said carburetor; the combination of an auxiliary reservoir having an inlet port at the top and an outlet port at the bottom thereof, a stem having a valve at each end, said valves being alternately cooperable with said ports upon vertical reciprocation thereof, a float secured to said stem intermediate the ends thereof, a conduit connecting said inlet port with said conduit connecting said fuel pump with said carburetor, a conduit connecting said outlet port with said fuel supply means, and means for withdrawing fuel from said reservoir for use in said fuel consuming device.

5. In a fuel supply system for a fuel consuming device subject to intermittent operation and used in connection with an internal combustion engine having a carburetor, a fuel supply, a fuel pump having an inlet and an outlet, a conduit connecting said supply with the inlet of said pump, and a conduit connecting the outlet of said pump with said carburetor; the combination of an auxiliary fuel reservoir having an inlet and an outlet, a reservoir inlet conduit affording communication between the outlet of said fuel pump and the inlet of said reservoir, a metering restriction in said last-named conduit, a reservoir outlet conduit affording communication between the outlet of said reservoir and the inlet of said fuel pump, an inlet valve for controlling the flow of fuel through said reservoir inlet conduit, an outlet valve for controlling the flow of fuel through said reservoir outlet conduit, a float operable to close said inlet valve and open said outlet valve when the fuel in said reservoir rises above a predetermined level and to open said inlet valve and close said outlet valve when the fuel in said reservoir drops below a predetermined level, and means for supplying fuel from said reservoir to said fuel consuming device.

6. In a fuel supply system for a heater of the internal combustion type used in connection with an internal combustion engine having a carburetor, a fuel supply, a fuel pump having an inlet and an outlet, a conduit connecting said fuel supply with said inlet, and a conduit connecting said outlet with said carburetor; the combination of an auxiliary reservoir having an inlet port and an outlet port, means for supplying fuel from said reservoir to said heater, means connecting the inlet port of said reservoir with the outlet of said fuel pump, a conduit connecting the outlet port of said reservoir with the inlet of said fuel pump, and means for controlling the flow of fuel through said inlet port and outlet port so as to maintain the fuel level in said reservoir substantially at a predetermined level.

HENRY J. DE N. McCOLLUM.
THOMAS F. SPACKMAN.